United States Patent
Matsumoto

(10) Patent No.: US 9,272,581 B2
(45) Date of Patent: Mar. 1, 2016

(54) PNEUMATIC TIRE

(71) Applicant: SUMITOMO RUBBER INDUSTRIES, LTD., Kobe-shi, Hyogo (JP)

(72) Inventor: Tadao Matsumoto, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 347 days.

(21) Appl. No.: 13/793,969

(22) Filed: Mar. 11, 2013

(65) Prior Publication Data

US 2013/0263992 A1 Oct. 10, 2013

(30) Foreign Application Priority Data

Apr. 4, 2012 (JP) ................. 2012-085755

(51) Int. Cl.
*B60C 13/00* (2006.01)
*B60C 13/02* (2006.01)

(52) U.S. Cl.
CPC ............... *B60C 13/02* (2013.01); *B60C 13/001* (2013.04)

(58) Field of Classification Search
CPC ...... B60C 13/02; B60C 13/001; B60C 13/00; B60C 13/023; B60C 13/002; B60C 13/003
USPC ................................. 152/523–525
See application file for complete search history.

(56) References Cited

U.S. PATENT DOCUMENTS

| 2,146,942 A * | 2/1939 | Czerwin | B60C 13/02 |
| | | | 152/153 |
| 5,388,627 A * | 2/1995 | Nakada | 152/454 |
| 2002/0174928 A1 * | 11/2002 | Ratliff, Jr. | B60C 13/001 |
| | | | 152/555 |
| 2003/0116246 A1 | 6/2003 | Kuroda | |
| 2008/0006359 A1 * | 1/2008 | Yamashita | 152/517 |
| 2009/0229722 A1 * | 9/2009 | Isobe | 152/209.18 |
| 2011/0088826 A1 * | 4/2011 | Watanabe | 152/523 |

FOREIGN PATENT DOCUMENTS

| DE | 102005018155 A1 * | 10/2006 | ............. B60C 13/02 |
| DE | EP 2055507 A1 * | 5/2009 | ............. B60C 13/02 |
| JP | 10076815 A * | 3/1998 | |
| JP | 2004-17829 A | 1/2004 | |

OTHER PUBLICATIONS

Machine Translation: JP 10076815 A; Wakamatsu, Masamichi; no date.*
Machine Translation: EP 2055507 A1; Rittweger Stefan; no date.*
Machine Translation: DE 102005018155 A1; Andrae Peter Erik; no date.*

* cited by examiner

*Primary Examiner* — Justin Fischer
*Assistant Examiner* — Kendra Ly
(74) *Attorney, Agent, or Firm* — Birch, Stewart, Kolasch & Birch, LLP

(57) ABSTRACT

A pneumatic tire is provided in the outer surface of each sidewall portion with a serrated zone formed by a number of serration grooves extending at an angle of at most 45 degrees with respect to the tire radial direction. Each of the serration grooves has a variable depth such that the deepest point lies between the radially outermost end and innermost end of the serration groove. The deepest point is positioned in a range between 0.2 time and 0.4 times a radial distance Ha from the maximum carcass section width position to the radially outermost end of the tire. As a result, the rolling resistance of the tire can be reduced.

13 Claims, 5 Drawing Sheets

PNEUMATIC TIRE

BACKGROUND OF THE INVENTION

The present invention relates to a pneumatic tire, more particularly to an external structure of the sidewall portion capable of reducing the rolling resistance of the tire.

In recent years, in view of resource saving and global environmental problems, pneumatic tires are strongly required to decrease the rolling resistance.

The rolling resistance can be decreased by decreasing the energy loss in various rubber components of a tire.

However, if a tread rubber having a low heat generation property is used in order to decrease the energy loss during running, the road grip, braking performance and steering stability are liable to deteriorate, therefore, the use of such rubber has its own limits.

On the other hand, the sidewall portions of a pneumatic tire are largely deflected during running. With this deflecting motion of the sidewall portions, the tire shoulder portions or tread shoulder portions are subjected to large stress or deformation, causing an energy loss in the tread rubber or so called wing rubber disposed in the tire shoulder portion.

SUMMARY OF THE INVENTION

It is therefore, an object of the present invention to provide a pneumatic tire, in which the transmission of motion or deflection of the sidewall portions to the tire shoulder portions is minimized to decrease the energy loss, and thereby the rolling resistance of the tire is reduced.

According to the present invention, a pneumatic tire comprises
a tread portion,
a pair of sidewall portions,
a pair of bead portions, and
a carcass which extends between the bead portions through the tread portion and the sidewall portions, defining a maximum carcass section width position at which the maximum section width of the carcass occurs, wherein
the sidewall portions are each provided in the outer surface thereof with a serrated zone formed by a number of serration grooves all of which extend at an angle of not more than 45 degrees with respect to the tire radial direction,
the serration grooves each have a variable depth such that its deepest point occurs between the radially outermost end and radially innermost end of the serration groove, and
the deepest point is positioned in a range between 0.2 time and 0.4 times a radial distance Ha from the maximum carcass section width position to the radially outermost end of the tire.

The pneumatic tire according to the present invention may have the following features (I)-(VI).
(I) The serration grooves extend straight or arc so that a variation of said angle becomes not more than 20 degrees.
(II) The maximum depth of the serration groove at the deepest point is 1.5 to 2.5 times the average depth of the serration groove.
(III) In each of the sidewall portions, the thickness between the bottom of the serration groove and the carcass becomes minimum at a radial position within a range between 5 mm radially outward and 5 mm radially inward of the deepest point.
(IV) In a buttress region defined as being radially outside the deepest point and axially outside the tread edge, there is no groove extending continuously in the tire circumferential direction.
(V) The serrated zone is an annular zone in which the serration grooves are arranged at small intervals successively in the tire circumferential direction.
(VI) The serration grooves are arranged around the tire rotational axis with an angular pitch of from 0.1 to 0.3 degrees.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure and standard tire load are uniformly defined by 180 kPa and 88% of the maximum tire load, respectively.

The tread edges Te are the axial outermost edges of the ground contacting patch of the tire (camber angle=0) in the normally inflated loaded condition.

DESCRIPTION OF THE PREFERRED EMBODIMENTS

Figure 1:
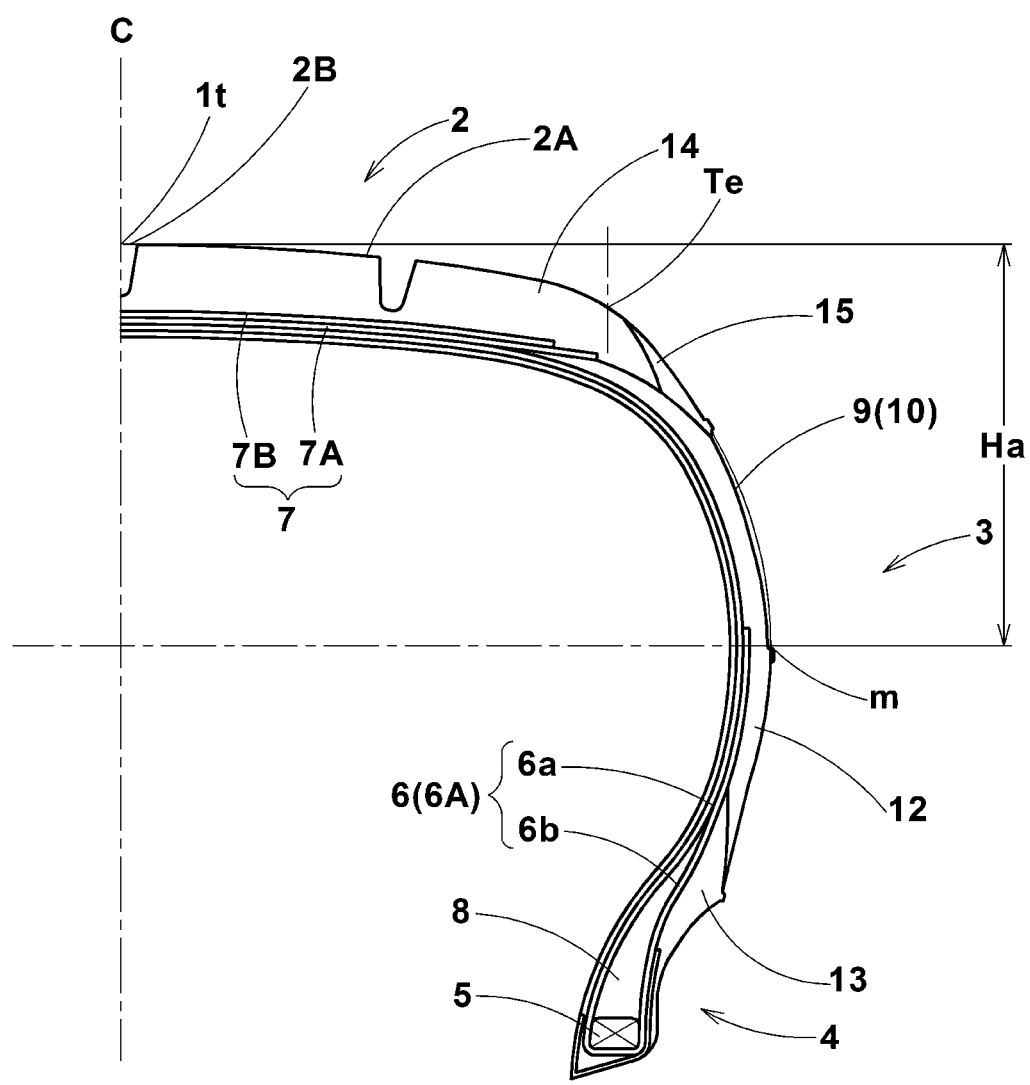
FIG. 1 is a cross sectional view of a pneumatic tire as an embodiment of the present invention.

Embodiments of the present invention will now be described in detail in conjunction with the accompanying drawings.

In the drawings, pneumatic tire 1 as an embodiment of the present invention is a passenger car tire. Aside form passenger car tire, the present invention may be applied to various pneumatic tires in other categories for example heavy duty tires and the like.

Figure 2:
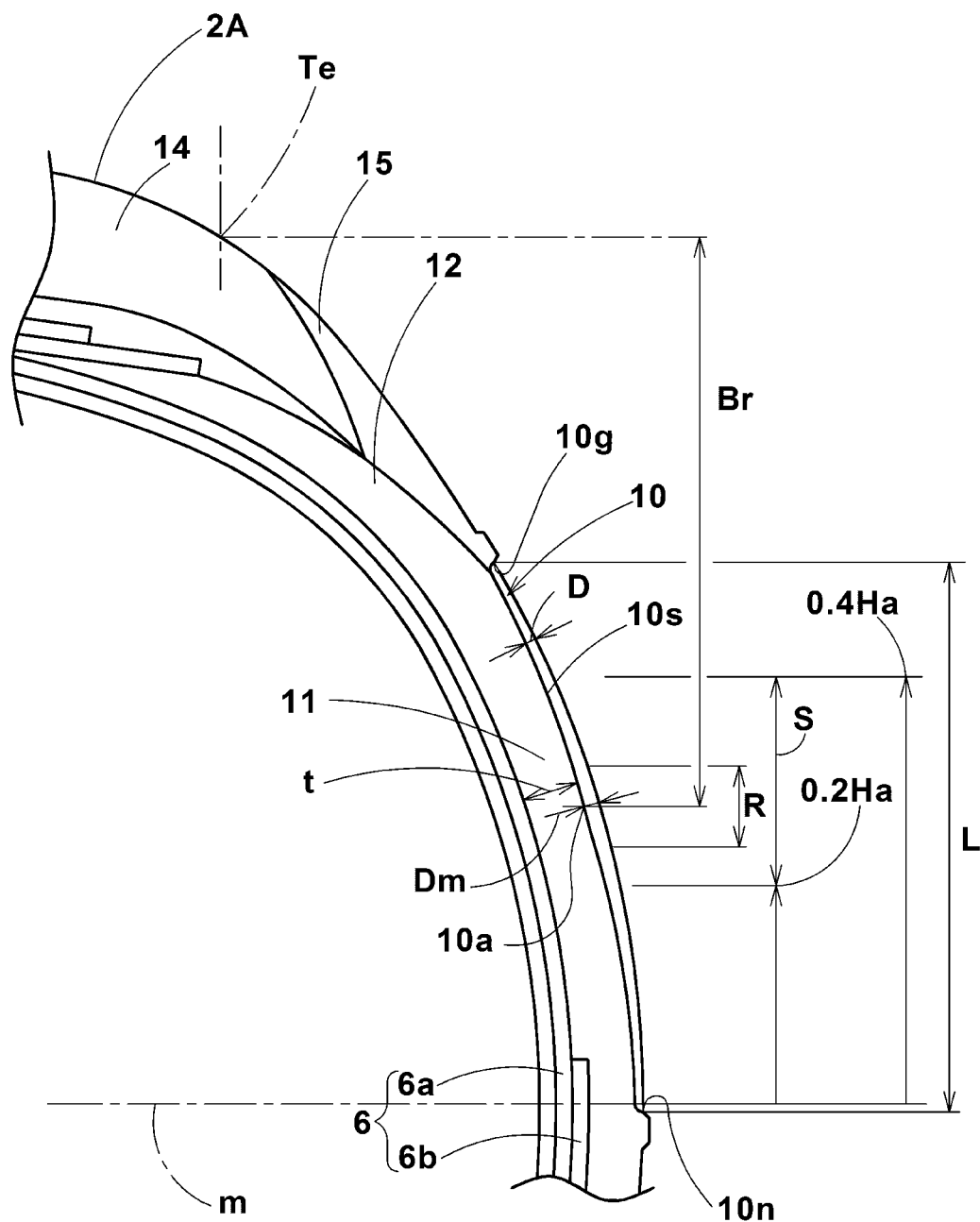
FIG. 2 is an enlarged cross sectional view of a shoulder portion of the pneumatic tire, wherein the cross section of the serrated zone is taken along the widthwise centerline of one of the serration grooves to show the variable depth of the serration groove.

The pneumatic tire 1 comprises, as shown in FIG. 1 and FIG. 2, a tread portion 2, a pair of bead portions 4 each with a bead core 5 therein, a pair of sidewall portions 3 extending therebetween. a toroidal carcass 6 extending between the bead portions 4 through the tread portion 2 and sidewall portions 3, a belt 7 disposed the radially outside the carcass 6 in the tread portion 2, a sidewall rubber 12 disposed axially outside the carcass 6 in each of the sidewall portions 3, a clinch rubber 13 disposed in each of the bead portions to form an outer surface of the bead portion 4 contacting with a wheel rim when the tire is mounted on the wheel rim, a tread rubber 14 disposed outside the belt 7 to form a tread face 2A contacting with the ground, a wing rubber 15 having a substantially triangular cross sectional shape and disposed in each tire shoulder portion and axially outside the tread rubber 14 and radially outside the sidewall rubber 12.

The carcass 6 is composed of at least one ply, in this embodiment only one ply 6A, of carcass cords arranged at an angle of from 75 to 90 degrees with respect to the tire circumferential direction, extending between the bead portions through the tread portion and sidewall portions, and turned up around the bead core 5 in each of the bead portions 4 from the inside to the outside of the tire so as to form a pair of turned up portions 6b and a toroidal main portion 6a therebetween.

The bead portions 4 are each provided between the turned up portion 6b and the main portion 6a of the carcass ply 6A with a bead apex rubber 8 extending radially outwardly from the bead core 5.

The belt 7 is composed of at least two plies, in this embodiment only two plies 7A and 7B of metal cords laid at angles of 15 to 40 degrees with respect to the tire circumferential direction.

optionally, a band (not shown) made of at least one cord wound on the radially outside of the belt 7 with a cord angle of less than 15 degrees may be further provided.

Each of the sidewall portions 3 is provided in the outer surface 3a thereof with a serrated zone 9.

Figure 3:
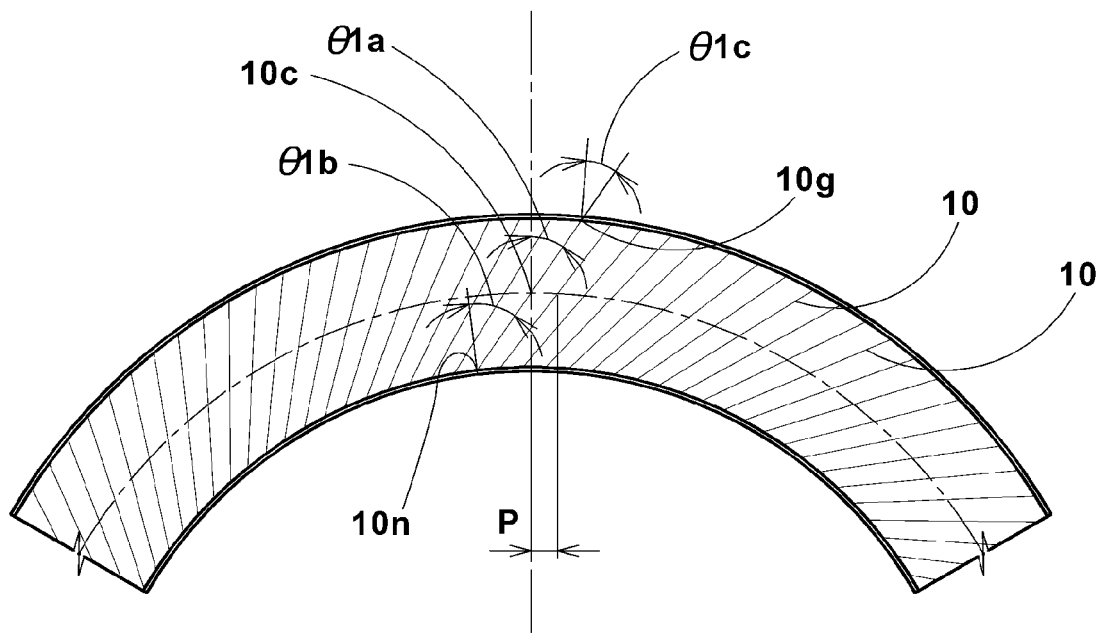
FIG. 3 and FIG. 4 each show an example of the serrated zone.
Figure 4:
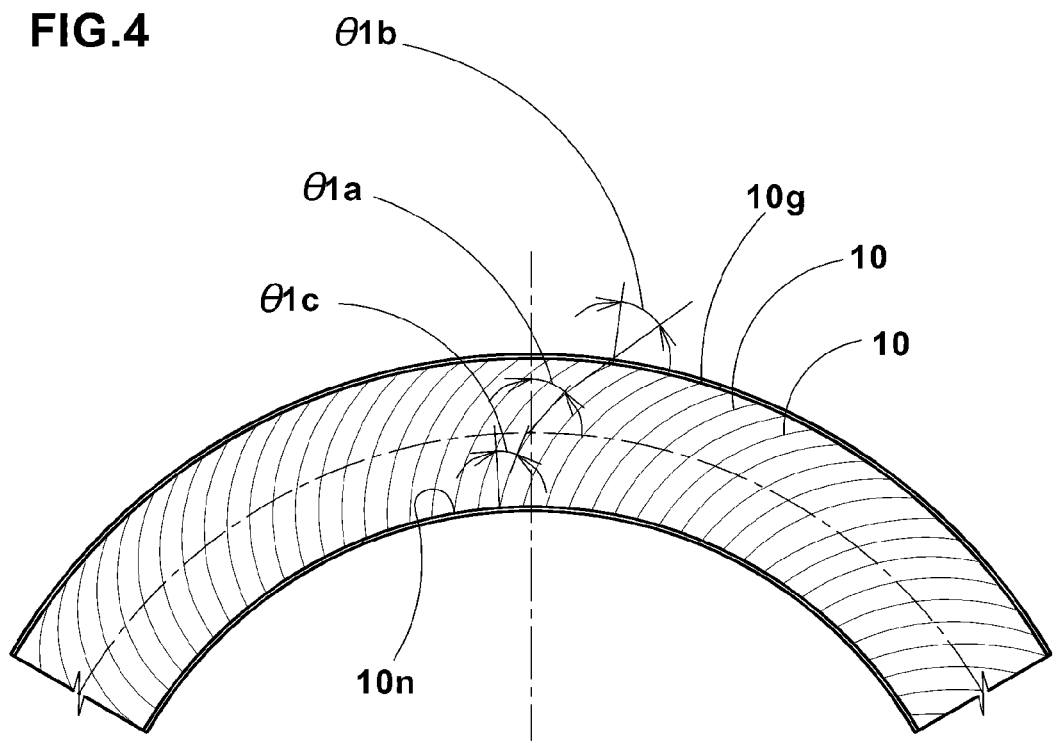
Figure 5:
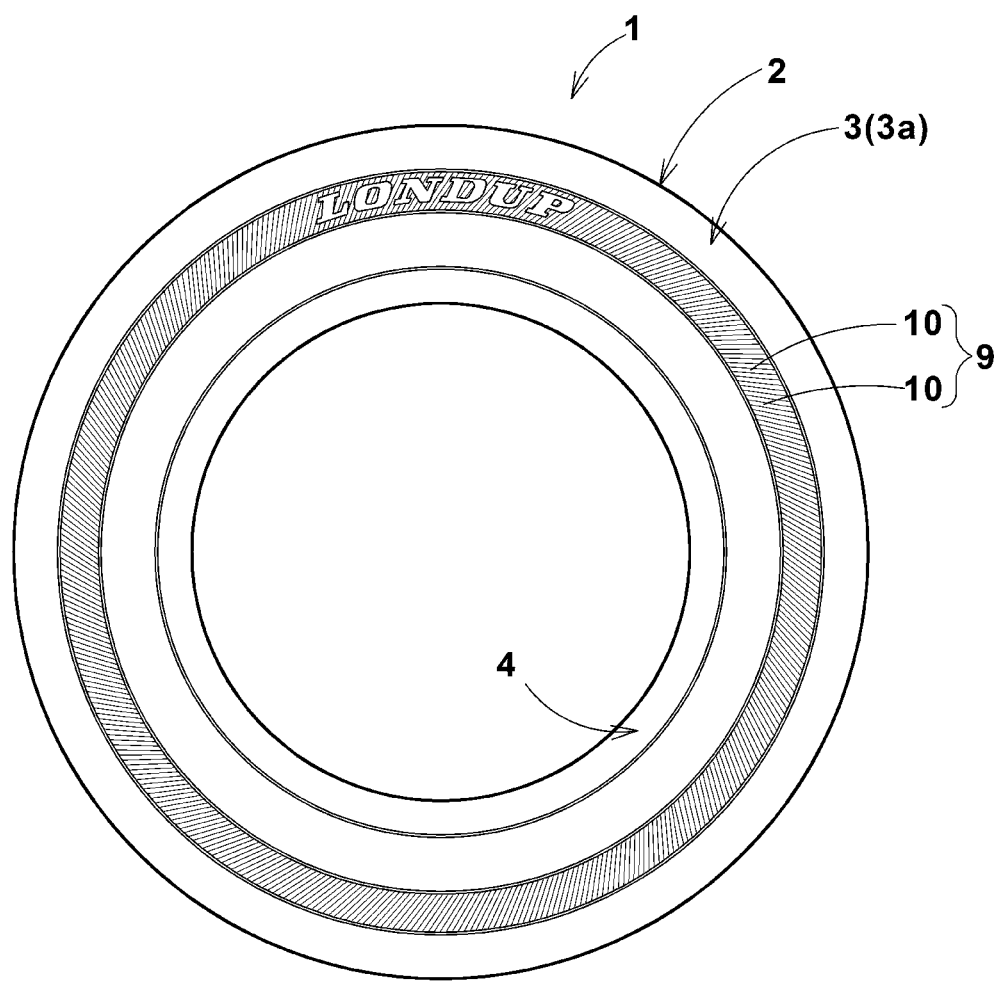
FIG. 5 shows an example of the serrated zone in which markings are formed.

The serrated zone 9 is, as shown in FIGS. 3, 4 and 5, formed by a large number of serration grooves 10 all of which extend at an angle θ1a. According to the strict definition, it can not be said that all of the serration grooves 10 are parallel, but when a small number of adjacent serration grooves 10 are considered, it can be said that the serration grooves 10 are almost parallel with each other.

In the side view of the tire 1, the angle θ1a with respect to the tire radial direction is not more than 45 degrees, preferably not more than 30 degrees, and preferably not less than 10 degrees when measured at the midpoint 10c between the radial position of the outermost end 10g of the serration groove 10 and the radial position of the innermost end 10n of the serration groove 10.

In the examples shown in FIGS. 3, 4 and 5, the midpoint 10c corresponding to the midpoint in the tire radial direction between the radially outer edge and the radially inner edge of the serrated zone.

If the angle θ1a is more than 45 degrees, cracks are liable to occur at the bottom of the serration grooves due to the tensile stress caused by sidewall deflections.

The serrated zone 9 may be formed discontinuously in the tire circumferential direction, for example, as a plurality of circumferentially-divided arc-shaped parts arranged around the tire rotational axis or as a single arc-shaped zone 9.

But, it is desirable that the serrated zone 9 is circumferentially continuous, in other words, annular in view of the uniformity of the tire.

In this embodiment, as shown in FIG. 2, each of the serration grooves 10 has a variable depth D, and the deepest point 10a lies between the radially outermost end 10g and innermost end 10n of the serration groove 10.

The deepest point 10a is not a dimensionless geometrical point. The deepest point 10a has a certain extent more or less.

The deepest points 10a of the serration grooves 10 have to be positioned within a range S between 0.2 times and 0.4 times the radial distance Ha from the maximum carcass section width position m to the radially outermost end 1t of the tire which usually occurs at or near the tire equator as shown in FIG. 1. Thus, the possible maximum radial extent of the deepest point 10a is 0.2 (=0.4−0.2) times the radial distance Ha. Preferably, the lower limit position of the range S is not less than 0.25 times the distance Ha. Preferably, the upper limit position of the range S is not more than 0.35 times the distance Ha. Therefore, in this preferable case, the possible maximum radial extent of the deepest point 10a is 0.1 (=0.35=0.25) times the radial distance Ha.

In the tire shoulder portion as shown in FIG. 2, there are the wing rubber 15 and an axial edge portion of the tread rubber 14 which have a relatively large thickness and large hysteresis loss when compared with the sidewall rubber 12. Therefore, if the deepest point 10a is formed radially outside the position of 0.4 times the distance Ha, the motion or deflection of the sidewall portions during running is transmitted to the wing rubber 15 and the tread rubber 14 and heat generation occurs therein, therefore, the rolling resistance can not be fully reduced.

On the other hand, if the deepest point 10a is formed radially inside the position of 0.2 times the distance Ha, since the deepest point 10a (thin portion) approaches the maximum carcass section width position m and this thin portion is subjected to the largest stress, therefore, cracks are liable to occur at the bottom 10s of the serration grooves 10.

The bending deformation due to the deflection of the sidewall portions concentrates at the deepest points 10a, therefore, in order to prevent the occurrence of cracks in the bottom of the serration grooves 10, the depth D of each of the serration grooves 10 is gradually smoothly increased toward the deepest point 10a from the outermost end 10g and from the innermost end 10n.

In this embodiment, the extent of the deepest point 10a along the longitudinal direction of the serration groove is minimum, and the groove depth D is gradually increased from the outermost end 10g and innermost end 10n to the deepest point 10a.

The maximum depth Dm at the deepest point 10a is preferably set in a range of not less than 1.5 times, more preferably not less than 1.7 times, but not more than 2.5 times, more preferably not more than 2.3 times the average depth Da of the serration groove 10.

Here, the average depth Da means the depth D averaged over the length of the serration groove 10 excepting its outer end portion extending 5 mm from the outermost end 10a and its inner end portion extending 5 mm from the innermost end 10n.

If the maximum depth Dm is more than 2.5 times the average depth Da, the stress concentration increases and the durability is liable to decrease. If the maximum depth Dm is less than 1.5 times the average depth Da, it becomes difficult to reduce the rolling resistance.

The average depth Da is preferably set in a range of not less than 0.2 mm, more preferably not less than 0.3 mm, but not more than 0.6 mm, more preferably not more than 0.5 mm. If the average depth Da is more than 0.6 mm, cracks are liable to occurs at the bottom of the serration groove.

Figure 6:
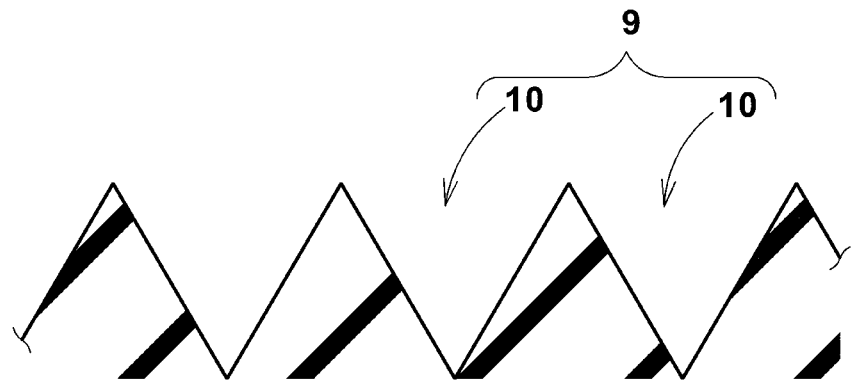
FIGS. 6, 7 and 8 each show an example of the cross section of a part of the serrated zone taken perpendicularly to the longitudinal direction of the serration grooves.
Figure 7:
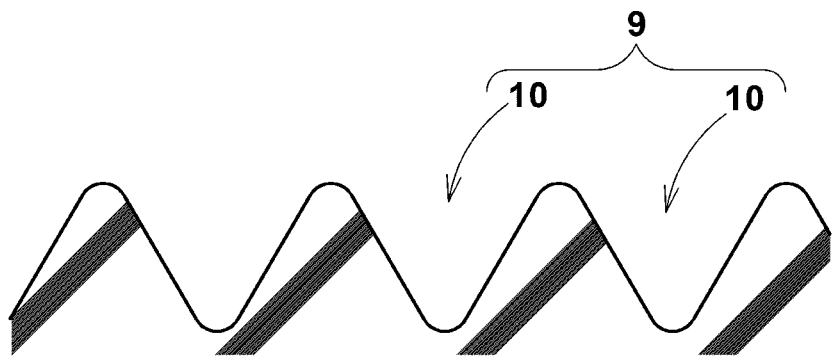
Figure 8:
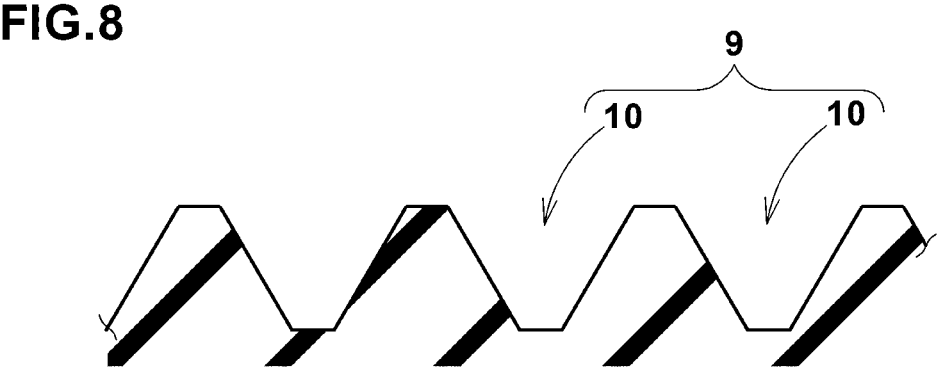

FIGS. 6-8 each show an example of the cross section of the serrated zone 9 taken perpendicular to the longitudinal direction of the serration grooves 10.

In the example shown in FIG. 6, the cross section has a triangular waveform. The serration grooves 10 are a V-shaped groove, and the serration ridges have a triangular cross sectional shape.

In the example shown in FIG. 7, the cross section has a substantially sinusoidal waveform.

In the example shown in FIG. 8, the cross section has a trapezoidal waveform. The serration grooves 10 are a truncated v-shaped groove, and the serration ridges have a trapezoidal cross sectional shape.

In this embodiment, a triangular waveform is employed.

It is preferable that the serration groove 10 extends straight in the side view of the tire as shown in FIG. 3 so that the difference $\theta1b-\theta1c$ between the maximum inclination angle $\theta1b$ and the minimum inclination angle $\theta1c$ with respect to the tire radial direction is not more than 20 degrees. In this case, the maximum inclination angle $\theta1b$ occurs at the innermost end 10n, and the minimum inclination angle $\theta1c$ occurs at the outermost end 10g.

However, as far as the angle difference $\theta1b-\theta1c$ is not more than 20 degrees, it is not always necessary that the serration groove 10 is straight. It may be curved for example arc-shaped as shown in FIG. 4. In FIG. 4, the serration grooves 10 are curved toward the radially outside. But, it is also possible that the serration grooves 10 are curved toward the radially inside. Further, the serration groove 10 may have reversely curved arc-shaped parts in combination to have a s-shaped configuration for example.

It is preferable that a thin sidewall part 11 in which the thickness t between the bottom 10s of the serration groove 10 and the main portion 6a of the carcass 6 becomes minimum, is formed in a range R between 5 mm radially outward and 5 mm radially inward of the deepest point 10a in order to reduce heat generation in this range R and thereby improve the durability and the rolling resistance at the same time.

In order to effectively derive such advantageous effects, it is desirable that the radial extent L of the serration grooves 10 or serrated zone is not less than 40%, more preferably not less than 45%, but not more than 70%, more preferably not more than 65% of the distance Ha.

Further, it is preferable that, in a buttress region Br defined as being radially outside the deepest point 10a and axially outside the tread edge Te, there is no groove extending continuously in the tire circumferential direction because if such groove is formed, a large bending deformation is caused therealong and heat generation occurs and the rolling resistance increases.

In the serrated zone 9, it is possible to form markings as shown in FIG. 5. The markings may be characters such as alphanumeric and symbols, diagrams and the like. It is better to keep away the markings from the above-mentioned range R around the deepest points 10 if possible. In any case, it is necessary to arrange the markings with close attention to the tire uniformity.

The serrated zone 9 constructed as explained above becomes matte. Therefore, the visibility of the markings will be improved if the markings look less matte or not matte. Further, a defective tire appearance such as bulge or dent due to the carcass play overlap joint, sidewall rubber overlap joint and the like can be made less noticeable by the serrated zone 9. In view of this function, it is preferable that the serration grooves 10 are arranged around the tire rotational axis with an angular pitch P of not less than 0.1 degrees and not more than 0.3 degrees. If the angular pitch P is less than 0.1 degrees or more than 0.3 degrees, it becomes difficult to make the bulge or dent less noticeable. Further, it is difficult to make the bulge or dent less noticeable if the above-mentioned average depth Da is less than 0.2 mm.

Comparison Tests

Based on the internal tire structure shown in FIG. 1 and the annular serrated zone shown in FIG. 5, test tires of size 195/65R15 (rim size: 15×6J) having specifications shown in Table 1 were prepared and tested for the rolling resistance.

The rolling resistance was measured by the use of a rolling resistance tester during running on the drum having a diameter of 1.7 meters at a speed of 60 km/h under a tire load of 4.2 kN and a tire pressure of 230 kPa.

The results are shown in Table 1 by an index based on Comparative example tire Ref.1 being 100, wherein the larger the index number, the lower the rolling resistance.

In addition, the visibility of the markings formed in the serrated zone was evaluated by five observers. The results are shown in Table 1 by an index based on comparative example tire Ref.1 being 100, wherein the larger the index number, the better the visibility.

TABLE 1

| Tire | Ref. 1 | Ref. 2 | Ex. 1 | Ex. 2 | Ex. 3 | Ref. 3 | Ex. 4 | Ex. 5 | Ref. 4 | Ex. 6 |
|---|---|---|---|---|---|---|---|---|---|---|
| angle θ1a (deg.) | 20 | 20 | 20 | 20 | 20 | 20 | 0 | 45 | 60 | 20 |
| angular pitch P (deg.) | 0.2 | 0.2 | 0.2 | 0.2 | 0.2 | 0.2 | 0.2 | 0.2 | 0.2 | 0.2 |
| deepest point position | *1 | 0.1 Ha | 0.2 Ha | 0.3 Ha | 0.4 Ha | 0.5 Ha | 0.3 Ha | 0.3 Ha | 0.3 Ha | 0.3 Ha |
| max. Dm/ave. Da | — | 2.0 | 2.0 | 2.0 | 2.0 | 2.0 | 2.0 | 2.0 | 2.0 | 1.0 |
| ave. Da (mm) | 0.4 | 0.4 | 0.4 | 0.4 | 0.4 | 0.4 | 0.4 | 0.4 | 0.4 | 0.4 |
| rolling resistance | 100 | 106 | 109 | 110 | 109 | 107 | 110 | 110 | 110 | 109 |
| visibility | 100 | 101 | 102 | 103 | 102 | 101 | 100 | 99 | 97 | 101 |

| Tire | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|
| angle θ1a (deg.) | 20 | 20 | 20 | 20 | 20 | 20 | 20 | 20 | 20 | 20 |
| angular pitch P (deg.) | 0.2 | 0.2 | 0.2 | 0.2 | 0.2 | 0.2 | 0.2 | 0.1 | 0.3 | 0.5 |
| deepest point position | 0.3 Ha | 0.3 Ha | 0.3 Ha | 0.3 Ha | 0.3 Ha | 0.3 Ha | 0.3 Ha | 0.3 Ha | 0.3 Ha | 0.3 Ha |
| max. Dm/ave. Da | 1.5 | 2.5 | 3.0 | 2.0 | 2.0 | 2.0 | 2.0 | 2.0 | 2.0 | 2.0 |
| ave. Da (mm) | 0.4 | 0.4 | 0.4 | 0.1 | 0.2 | 0.6 | 0.8 | 0.4 | 0.4 | 0.4 |
| rolling resistance | 110 | 110 | 108 | 107 | 108 | 108 | 108 | 108 | 108 | 108 |
| visibility | 102 | 102 | 102 | 101 | 102 | 102 | 101 | 101 | 102 | 101 |

*1) serration grooves each had a constant depth.

The invention claimed is:

1. A pneumatic tire comprising
a tread portion,
a pair of sidewall portions,
a pair of bead portions, and
a carcass which extends between the bead portions through the tread portion and the sidewall portions, defining a maximum carcass section width position at which the maximum section width of the carcass occurs,
wherein
the sidewall portions are each provided in the outer surface thereof with a serrated zone formed by a plurality of serration grooves all of which extend at an angle of not more than 45 degrees with respect to the tire radial direction,
the serration grooves each have a variable depth so that its deepest point occurs between the radially outermost end and radially innermost end of the serration groove, the variable depth increasing gradually from the radially outermost end to said deepest point and increasing gradually from the radially innermost end to said deepest point,
the deepest point is positioned in a range between 0.2 times and 0.4 times a radial distance Ha from the maximum carcass section width position to the radially outermost end of the tire, and
in each sidewall portion, a thickness between the bottom of each serration groove and a main portion of the carcass becomes minimum at a radial position within a range between 5 mm radially outward and 5 mm radially inward of the deepest point.

2. The pneumatic tire according to claim 1, wherein the serration grooves extend straight or arc so that a variation of said angle becomes not more than 20 degrees.

3. The pneumatic tire according to claim 2, wherein in a buttress region defined as being radially outside the deepest point and axially outside the tread edge, there is no groove extending continuously in the tire circumferential direction.

4. The pneumatic tire according to claim 2, wherein the serrated zone is an annular zone in which the serration grooves are arranged at small intervals successively in the tire circumferential direction.

5. The pneumatic tire according to claim 1 or 2, wherein the maximum depth of the serration groove at the deepest point is 1.5 to 2.5 times an average depth of the serration groove.

6. The pneumatic tire according to claim 5, wherein the serrated zone is an annular zone in which the serration grooves are arranged at small intervals successively in the tire circumferential direction.

7. The pneumatic tire according to claim 5, wherein in a buttress region defined as being radially outside the deepest point and axially outside the tread edge, there is no groove extending continuously in the tire circumferential direction.

8. The pneumatic tire according to claim 1, wherein in a buttress region defined as being radially outside the deepest point and axially outside the tread edge, there is no groove extending continuously in the tire circumferential direction.

9. The pneumatic tire according to claim 8, wherein the serrated zone is an annular zone in which the serration grooves are arranged at small intervals successively in the tire circumferential direction.

10. The pneumatic tire according to claim 1, wherein the serrated zone is an annular zone in which the serration grooves are arranged at small intervals successively in the tire circumferential direction.

11. The pneumatic tire according to claim 1, wherein the serration grooves are arranged around the tire rotational axis with an angular pitch of from 0.1 to 0.3 degrees.

12. The pneumatic tire according to claim 1, wherein the serrated zone is an annular zone in which the serration grooves are arranged with an angular pitch of from 0.1 to 0.3 degrees, and
the deepest points of all of the serration grooves are positioned at the same radial height.

13. The pneumatic tire according to claim 12, wherein in a buttress region defined as being radially outside the deepest points and axially outside the tread edge, there is no groove extending continuously in the tire circumferential direction.

* * * * *